A. JELLIFFE.
DEVICE FOR DISPLAYING DRESS GOODS.
APPLICATION FILED FEB. 5, 1917.
1,264,653.
Patented Apr. 30, 1918.
4 SHEETS—SHEET 3.
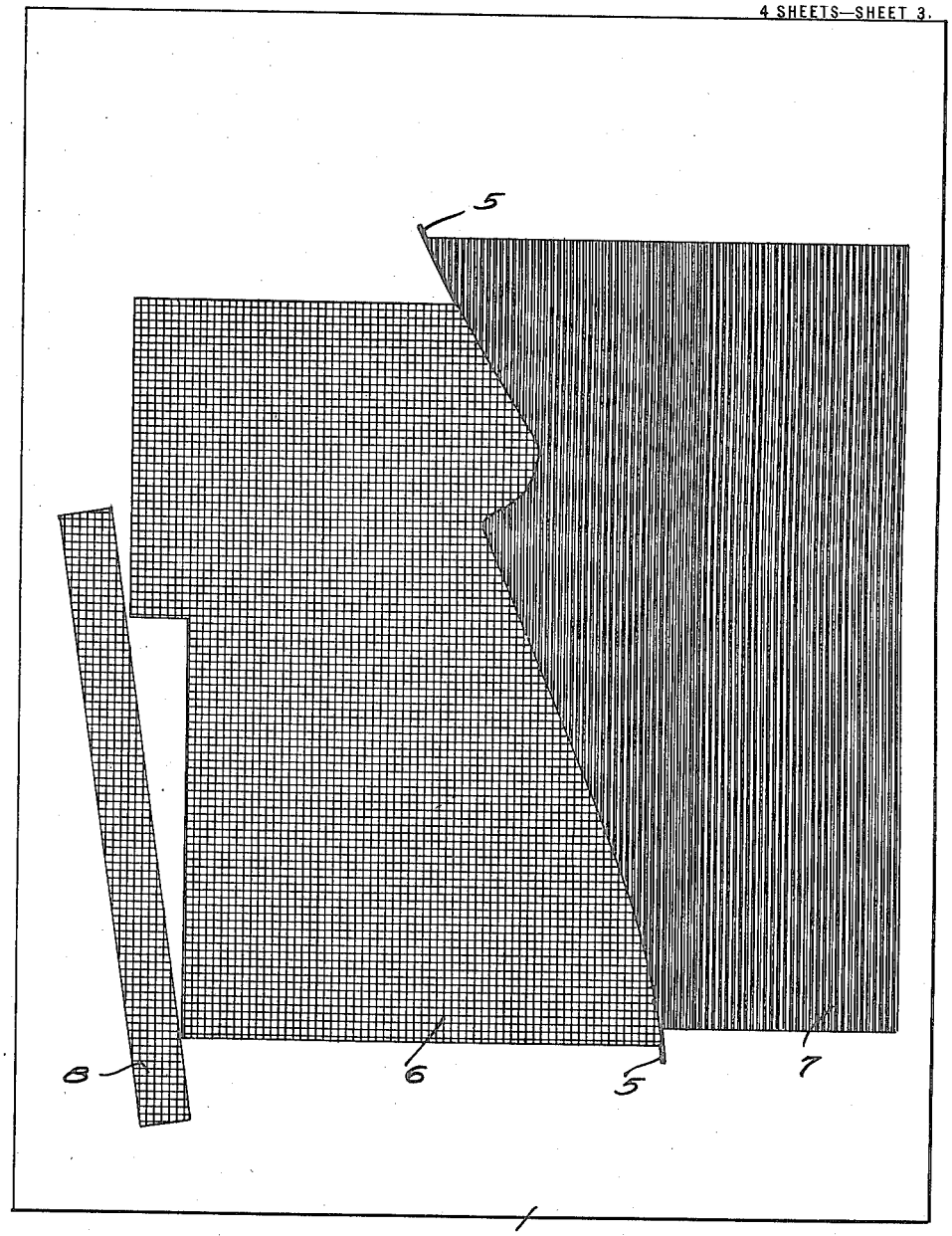
FIG. 3.
FIG. 4.
WITNESSES
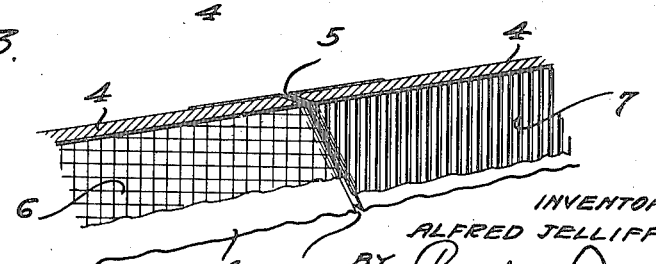
INVENTOR
ALFRED JELLIFFE
BY
ATTORNEYS

A. JELLIFFE.
DEVICE FOR DISPLAYING DRESS GOODS.
APPLICATION FILED FEB. 5, 1917.

1,264,653.

Patented Apr. 30, 1918.
4 SHEETS—SHEET 4.

WITNESSES

INVENTOR
ALFRED JELLIFFE
BY
ATTORNEYS

UNITED STATES PATENT OFFICE.

ALFRED JELLIFFE, OF MINNEAPOLIS, MINNESOTA.

DEVICE FOR DISPLAYING DRESS GOODS.

1,264,653.  Specification of Letters Patent.  Patented Apr. 30, 1918.

Application filed February 5, 1917. Serial No. 146,699.

*To all whom it may concern:*

Be it known that I, ALFRED JELLIFFE, a citizen of the United States, resident of Minneapolis, county of Hennepin, State of Minnesota, have invented certain new and useful Improvements in Devices for Displaying Dress Goods, of which the following is a specification.

The object of my invention is to provide a device or apparatus by means of which dress goods of varying styles and patterns can be conspicuously and attractively displayed.

A further object is to provide a display device adapted particularly for a show window, the various patterns of goods being exhibited to interested persons passing the store.

A still further object is to provide a display device by means of which different styles and colors of dress goods can be displayed on figures in groups of two or more, the outline of each figure being sharply defined.

Other objects of the invention will appear from the following detailed description.

The invention consists generally in various constructions and combinations, all as hereinafter described and particularly pointed out in the claims.

Figure 1:
Figure 2:
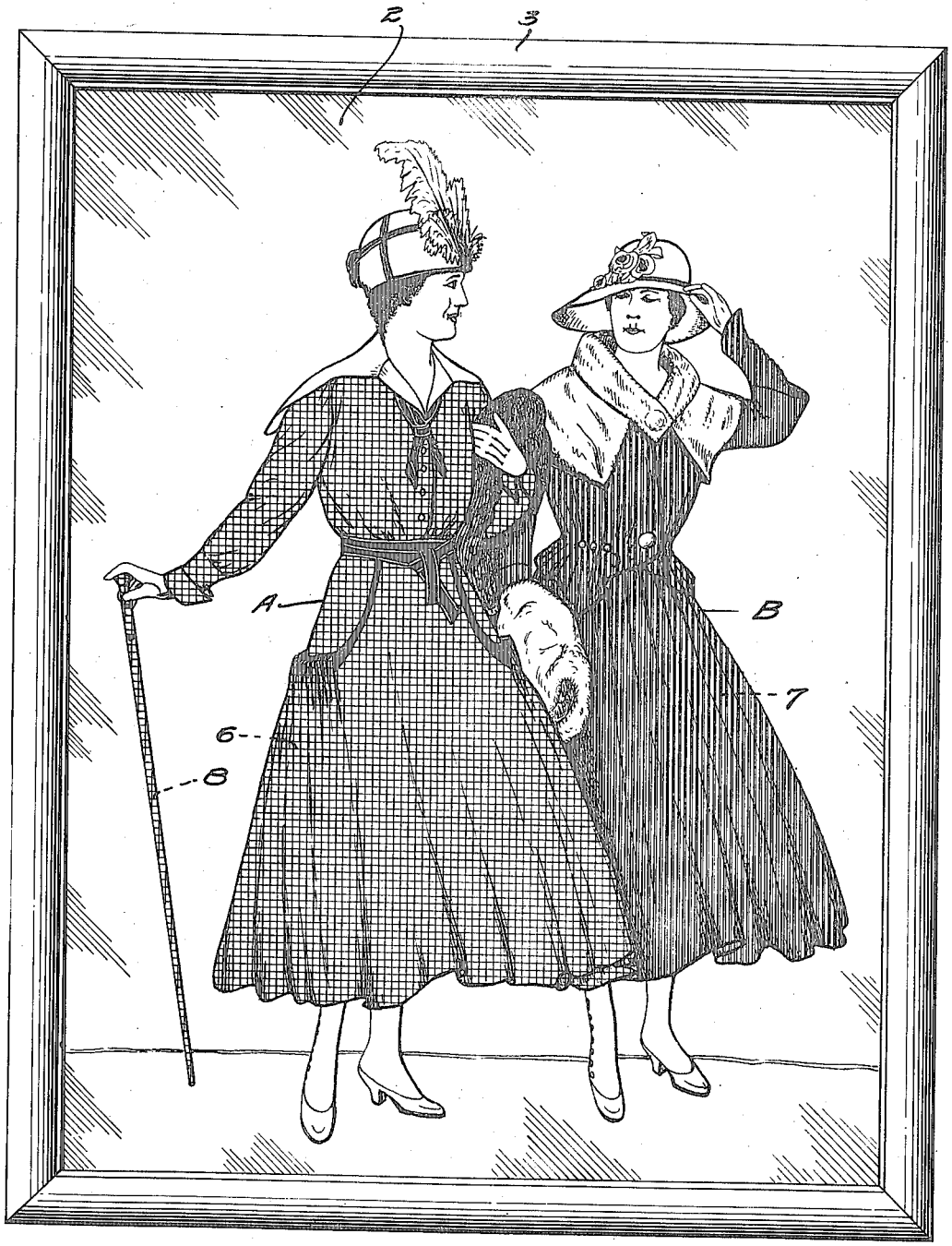
Figure 5:
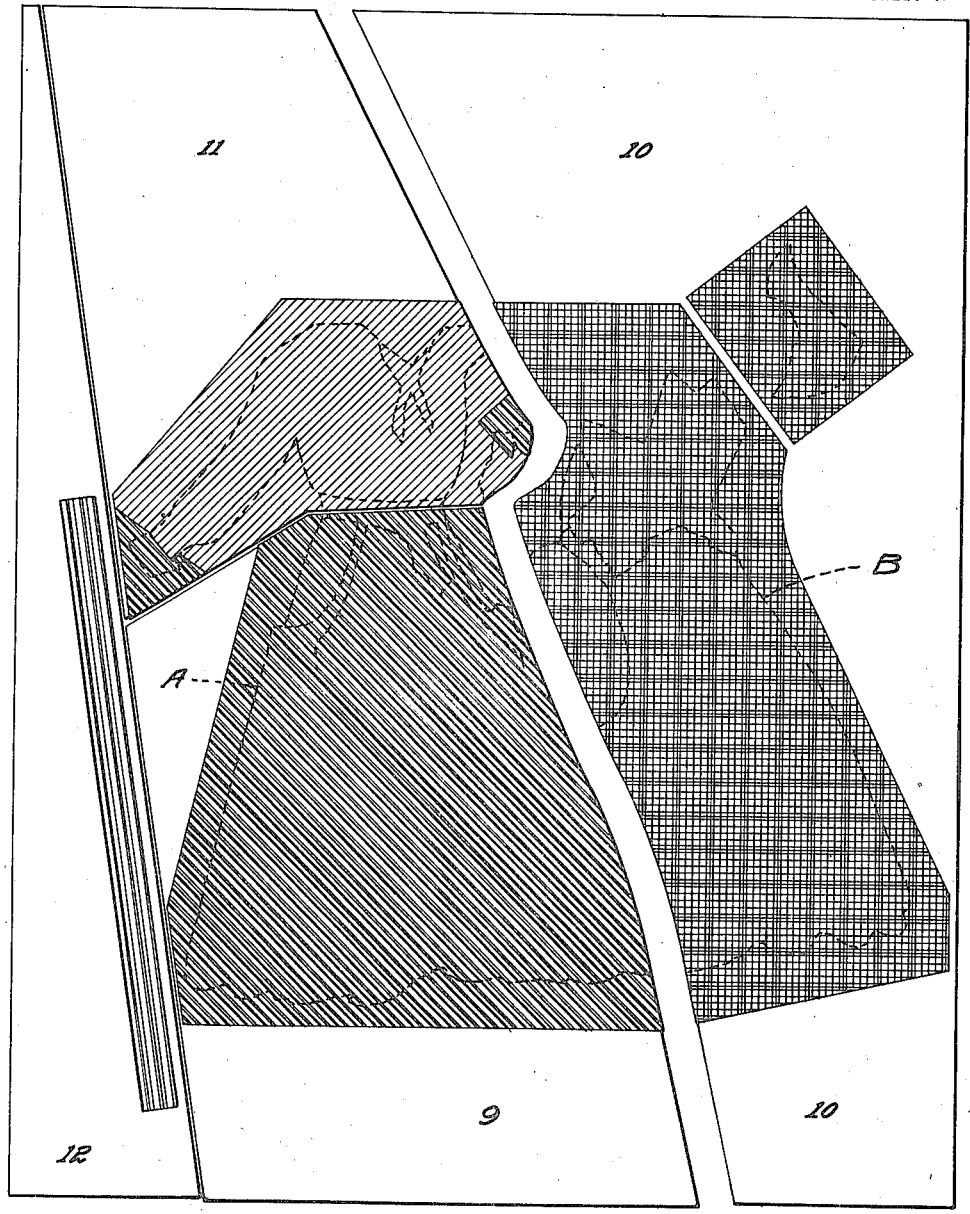

In the accompanying drawings forming part of this specification,

Figure 1 is a front elevation of a display frame embodying my invention,

Fig. 2 is a similar view, showing the appearance of the figures or models when certain patterns of dress goods are placed in the rear of the frame, Fig. 3 is a view showing the manner of mounting the dress goods on a supporting card, so that the dividing line between the different patterns will register with the line between the figures, Fig. 4 is a sectional view of the card, showing the proper manner of mounting the patterns thereon, Fig. 5 is a modified form of card, showing another way of arranging the dress patterns.

In the drawing, 2 represents a panel of glass or other suitable transparent material, having a suitable frame 3. The panel may be of any desired size, suitable for exhibiting the different patterns of goods. On one side of the panel the figures shown, which I will designate as A and B, are photographed. These photographs are transparent, while all around them, following the outlines of the figures, the panel is opaque, all parts of the figures being transparent and each wearing a fashionably cut gown. It is evident that when a piece of dress goods is placed back of the panel, it will be visible through the panel to a person standing in front and the figure will be represented as dressed in the goods so displayed, and if there are a number of figures in the panel, a corresponding number of dress goods patterns may be displayed by arranging them in the rear of the figures with suitable provision for defining the line of division between each figure. This involves an arrangement of registration whereby the pattern to be displayed will register with the line of division between its figure and the adjoining one. I will now describe in detail the provision I make for registration of the goods with the figures.

In order that the different figures may display different patterns of goods, I mount the goods on a suitable support, such as a card 4, and in this card I provide a slit 5 extending lengthwise of the card along an irregular line to indicate the dividing line between the garments of the two figures. Into this slit I thrust the edges of the dress goods patterns 6 and 7 to be displayed respectively on the figures A and B and on one side of the pattern 6 I provide a section 8 of the pattern that is exposed through the representation of the cane carried in the right hand of the figure A. When the card bearing these patterns of dress goods, one a check and the other a stripe, is placed in the rear of the model figures on the transparent panel, the models will appear as indicated in Fig. 2, figure A dressed in a check gown and figure B in a stripe gown. The purpose of providing the slit to receive the dress goods is to insure a sharp line of division between the garments of the two figures, which would hardly be possible if the raw edges of the dress goods were placed together.

I provide a number of cards, as many as there are different dress goods to be displayed, and as fast as one card is removed another one may be substituted so that each card bearing different patterns of goods, the dress of the figures will change with every change of the cards.

In Fig. 5 I have illustrated a modified construction, in which the supporting card for the goods is divided into a series of sections 9, 10, 11 and 12, each having mounted thereon a piece of the pattern the demonstrator wishes to display and these patterns can, of course, be varied by simply substituting one section of a card for another and as many cards may be provided as there are different patterns of goods to be displayed.

The figures may be represented on the panel in any size and there may be two or more persons represented in the panel, or I may provide but one figure as a model. Generally, however, I prefer at least two, for the purpose of presenting a contrast in the dress goods and in the styles of the dresses displayed.

I claim as my invention:

1. A dress goods display device comprising a panel having a transparent area representing a plurality of intersecting fashionably dressed figures and otherwise opaque, and means for supporting different patterns of dress goods in the rear of said figures, the dividing line between the patterns of dress goods registering with the outline of the intersecting figures, the dress of each figure changing to correspond with every variation in the pattern of the goods.

2. A dress goods display device comprising a panel having transparent fashion figures thereon, one figure overlapping and partially covering the other figure, and a support for different patterns of dress goods arranged in the rear of said panel and visible through said figures, the dividing line between the patterns of dress goods registering with the outline of the overlapping figures.

3. A dress goods display device comprising a panel having a transparent area representing fashion models, a plate arranged to be mounted in the rear of said panel and having a slit therein to register with the line of division between the figures, the edges of the dress goods being inserted into and folded around the edges of said slit, and said slit registering with the line of division between the fashion models in said panel.

In witness whereof, I have hereunto set my hand this 25th day of January 1917.

ALFRED JELLIFFE.